United States Patent Office 2,775,633
Patented Dec. 25, 1956

2,775,633

SEPARATION OF TERTIARY OLEFINS

Merrell R. Fenske and Jennings H. Jones, State College, Pa., assignors to Esso Research and Engineering Company, a corporation of Delaware No Drawing. Application December 10, 1953, Serial No. 397,471

20 Claims. (Cl. 260—677)

This invention relates to the separation of tertiary olefins from other hydrocarbons by selective reaction with a fluorinated carboxylic acid.

Petroleum refining processes such as thermal or catalytic cracking produce mixtures of hydrocarbons which generally include substantial amounts of tertiary olefins. For various reasons it is frequently desirable to separate these tertiary olefins from the other hydrocarbons. For instance, it may be desirable to recover substantially pure isobutylene because of its value as a raw material in the manufacture of butyl rubber, tertiary butyl alcohol, or the like. In other instances, as in the case of acid treating of naphthas or the like, it may be desirable to remove tertiary olefins from the hydrocarbon mixture prior to treating, inasmuch as tertiary olefins unduly increase the amount of acid required for the treatment. Or it may be desirable to segregate tertiary olefins as premium gasoline components, in view of their good anti-knock qualities.

Heretofore such separations have usually been based on fractional distillation, as far as there was a sufficient difference in boiling point between the materials to be separated. As best, this involved the difficulty of separating rather close boiling cuts. Frequently, however, the difference in boiling points was too small to make fractional distillation practicable. Methods of separating various types of hydrocarbons by chemical means have also been proposed previously. However, these methods have generally proved too expensive for anything but strictly analytical purposes, either because of the cost of reagents, or because of the destruction of a part of the mixture being analyzed. Still other methods proposed for separating tertiary olefins have been found wanting because of their poor selectivity, especially with respect to differentiating between tertiary and secondary olefins.

It is, therefore, an object of the present invention to provide an efficient chemical method for selective removal of tertiary olefins from mixed hydrocarbon streams. Another object is to make such a separation at a reasonably low reagent cost, and with a minimum destruction of the hydrocarbon feed. Still another object is to remove tertiary olefins from other hydrocarbons by chemically converting the former into compounds from which both the reagent and the tertiary olefin can be readily regenerated in a form suitable for further use. A more specific object is to separate tertiary olefins from other hydrocarbons by reaction with a perfluorocarboxylic acid under selective and non-destructive conditions. These and other objects, as well as the nature of the invention, will become more clearly apparent from the following description.

For purposes of the present invention a tertiary olefin is defined as an unsaturated hydrocarbon in which at least one of the carbon atoms of the double bond is devoid of hydrogen. It thus is an olefin having the formula

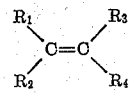

wherein $R_1$ and $R_2$ represent an alkyl group such as methyl, ethyl, hexyl, dodecyl, cyclohexyl, or a similar alkenyl group such as 3-butenyl, while $R_3$ and $R_4$ may be either hydrogen atoms or radicals of the same kind as $R_1$ and $R_2$. Examples of tertiary olefins are: 1,1-dimethyl ethylene(isobutylene), 2-ethyl-octene-1, 1-methyl-1-propyl-butene-1, 3-methyl-hexene-3, 7-methyl-8-propyl-dodecene-7, 1-methylcyclohexene, 1-butylcyclopentene, 1,2-dimethylcyclohexene and the like. In contrast, in secondary olefins at least one of the carbon atoms of the double bond possesses only one hydrogen while the other carbon of the double bond may possess one or two hydrogens. Accordingly, secondary olefins are identified by the formula $RHC=CHR'$ wherein R again is a radical of the same kind as $R_1$ described above whereas $R'$ may be either a hydrogen atom or again a radical of the same kind as $R_1$. Examples of secondary olefins are propene, butene-1, octene-1, tetradecene-1, butene-2, pentene-3, hexene-3, decene-4, octadecene-4, cyclohexene, 3-methylcyclohexene, cyclopentene, 4-ethylcyclopentene, and so on. Ethylene, of course, is a primary olefin. The invention is particularly applicable to the treatment of $C_4$ to $C_{16}$ olefins as illustrated by the aforementioned compounds and its effectiveness will be hereafter demonstrated especially in connection with the selective separation of tertiary olefins boiling in the naphtha range between about 90 and 123° C. The conversion of $C_6$ and higher olefins is of particular interest.

It has now been discovered that perfluorocarboxylic acids, that is, fully fluorinated monobasic or dibasic carboxylic acids, and particularly fatty acids such as trifluoroacetic, pentafluoropropionic and heptafluorobutyric acid, as well as other fully fluorinated acids such as malonic, maleic, succinic, benzoic, phthalic, and cyclohexane carboxylic, have the ability of selectively reacting with tertiary olefins, without unwanted side reactions, provided that certain critical conditions are observed.

In particular it has been discovered that perfluoroacids such as trifluoroacetic acid can be selectively reacted with tertiary olefins to form esters, without reacting with other types of hydrocarbons present such as secondary olefins. And when desired, the fluoroacid can be subsequently regenerated by saponification, or by alcoholysis or hydrolysis. The fluoroacids differ fundamentally from the analogous chloroacids such as trichloroacetic acid, since the latter gives considerable amounts of high boiling materials due to a lack of selective action. Furthermore, upon saponification with a base the chloroacid is not regenerated as its sodium salt, but the chlorine atoms also undergo reaction and form the alkali chloride.

For the case of trifluoroacetic, pentafluoropropionic, and heptafluorobutyric acids, in order to keep the fluoroacid reaction selective for tertiary olefins, it is necessary to carry it out at temperatures below about 30° C., and preferably between about −15 and +15° C., and especially between about −5 and +5° C., depending upon the nature of the tertiary olefin involved and also on other constituents present in the mixture. For instance, when isobutylene is being reacted, temperatures above 15° C. may cause undue polymerization of the olefin, whereas with 3-ethyl-3-octene a temperature of 25° C. is entirely satisfactory. On the other hand temperatures below about −15° C. are not normally practical, since all three of the principal monobasic fluoroacids mentioned become solid at about −15° C. Nevertheless, lower temperatures may be used if a suitable low freezing diluent is used. For instance, the alkyl ester formed in the reaction itself somewhat lowers the freezing point of the fluoroacid. Similarly halogenated aliphatic hydrocarbons such as methyl chloride, ethyl chloride, the various low freezing chlorofluoroalkanes (Freons), and the like can be added to the reaction mixture so as to permit operation at low temperatures. Thus it may be feasible, for instance, to separate isobutylene directly from the effluent from the polymerization of butyl rubber at temperatures as low as —100° C., since such effluent generally contains relatively large amounts of methyl or ethyl chloride.

For the case of selectively separating tertiary olefins with the aid of a dibasic perfluoroacid such as perfluorosuccinic acid, temperatures between about 45 to 70° C. should be used. Below temperatures of about 30° C. essentially no reaction occurs; above temperatures of 70 to 80° C., secondary olefins begin to react also.

Since most of the tertiary olefins are liquids at normal temperatures and pressures, pressure is not an important variable in these reactions. That is, the reactions take place in the liquid phase and pressure needs to be only high enough to have appreciable amounts of the olefins present as liquid or dissolved in the perfluoroacids. Usually pressures ranging from atmospheric to about 75 p. s. i. g. are sufficient, though pressures as high as 200 p. s. i. g. or even higher may be used if special circumstances warrant.

The choice of the particular acid best used in any given case will depend on the olefin starting material or the particular process being carried out. Thus, it is desirable to use that acid which, because of boiling point differential or ease of recovery, works best for the special case under consideration.

In carrying out the separation, it is desirable to use at least one mol or equivalent (in the case of a dibasic acid) of the fluoroacid per mol of tertiary olefin present in the hydrocarbon mixture to be treated. Thus in commercial separations it may be preferred to use about 1.1 to 2 mols or equivalents of the fluoroacid per mol of tertiary olefin. Stepwise or counter-current treatment with the acid may be particularly advantageous where substantially complete removal of the tertiary olefins is desired, so as to assure that strong acid is available even when the concentration of the tertiary olefin is low. Furthermore, perfluoroacids, and particularly trifluoroacetic acid which is especially convenient to handle, may be used even for quantitative determination of tertiary olefins. In such a case it is desirable to use at least 4 mols of the acid, preferably about 5 to 10 mols of the acid per mol of tertiary olefin. After completion of the reaction, the unused excess of the fluoroacid may be determined by conventional titration with a standard base such as sodium hydroxide. The number of mols of the fluoroacid used up in the reaction then equals the number of mols of tertiary olefin originally present, where a monobasic fluoroacid is used. Of course, in the case of polybasic fluoroacids, one mol of a dibasic acid is equivalent to two mols of tertiary olefin, and so on.

After completion of the reaction, the fluoroacid or olefin or both may be recovered from the reaction mixture. For instance, sufficient vacuum may be applied so as to distill over the unreacted hydrocarbons, e. g. paraffins, secondary olefins, aromatics or naphthenes, without substantially exceeding the reaction temperature at which the selective esterification was originally carried out. At higher temperatures there is the danger of decomposing the formed ester at least in part to yield the fluoroacid and olefin dimer and higher polymers, and of impairing the selectivity of the original reaction by esterification of other than the tertiary olefins. Accordingly, it may be necessary to distill the unreacted hydrocarbons at a reduced pressure which may range from about 500 to 10 mm. Hg. However, in certain cases it may actually be desirable to make polymers of the t-olefins and separate them by making use of their high boiling point.

The remaining mixture containing free fluoroacid and the fluoroester of the tertiary olefin may then be treated in various ways. For instance, by adding an ether such as 1,4-dioxane in sufficient quantity to form a complex with the used acid, or by using other suitable complex forming agent such as acetone, the tertiary olefin may be regenerated from the ester by heating the mixture to a sufficiently high temperature, such as 120° C. in the case of t-butyltrifluoroacetate. Under these conditions the addition of dioxane forms a complex with the free fluoroacid and prevents the acid from polymerizing the olefin. In fact, in the case of a mixture of $C_4$ mono-olefins isobutylene can be recovered from the mixture by heating in the presence of the complex forming agent such as dioxane, without any need for preliminary vacuum distillation of the unreacted hydrocarbons, since 1- and 2-butene do not react with the fluoroacid under these conditions. Thus, the unreacted hydrocarbons can first be driven off by atmospheric distillation in the presence of the complex forming agent whereupon the tertiary olefin is regenerated from the remaining ester at a regeneration temperature which is substantially higher than the distillation temperatures of the unreacted hydrocarbons. The acid-dioxane complex resulting from the regeneration then may be cooled to the required temperature and used instead of the free fluoroacid for further selective reaction.

Alternatively, the fluoroacid may be recovered from the reaction mixture by converting the ester to an alcohol and the starting acid. For instance, enough aqueous sodium or potassium hydroxide or triethanolamine or other strong base may be added to the reaction both to neutralize any free fluoroacid and to saponify the ester, e. g., t-octyl trifluoroacetate. The fluoroacid may then be regenerated from the salt by acidification with an equivalent amount of sulfuric acid or other strong acid such as hydrochloric, phosphoric, or the like. Another technique for recovering the fluoroacid involves alcoholysis followed by hydrolysis. This is particularly useful where the fluoroacid has been reacted with a higher olefin such as 2-methyl-1-pentene, 1-methyl-1-cyclopentene, hexene, or 2,4,4-trimethyl-1-pentene or higher. In this manner the original ester can be converted into a higher alcohol and on essentially completely hydrolyzable ester by reaction with methyl, ethyl or propyl alcohol, and the fluoroacid can then be recovered from the resulting low molecular weight ester by ordinary hydrolysis.

In other cases the fluoroacid esters may be hydrolyzed directly. Thus, for instance, cyclopentyl as well as cyclohexyl trifluoroacetate may be refluxed with an excess of water and the corresponding alcohol recovered by steam distillation. The perfluoroacid may be removed from the aqueous solution by extraction with diethyl or diisopropyl ether or the acid may be concentrated by distillation since the azeotrope containing about 81% acid boils at 105° C. Finally, where the product ester is essentially completely hydrolyzable in the first place, as in the case of esters such as ethyl or isopropyl pentafluoropropionate, hydrolysis may be obtained simply by boiling with water in such a manner that the low-boiling ternary distillate mixture of water, alcohol, and ester is collected in a trap so constructed that the heavy ester phase which separates out in the trap is returned directly to the still. By removing the lighter phase the alcohol may be recovered as an aqueous solution. The water phase remaining in the still contains the regenerated fluoroacid which may be concentrated by distillation or extraction for reuse.

In the case of the first recovery method involving saponification and acidification, the alcohol formed from the reacted olefin may be recovered immediately following saponification and acidification either by direct distillation in the case of lower alcohols or by steam distillation in the case of higher ones. After acidification the regenerated perfluoroacid may be removed either by distillation or by ether extraction as indicated above.

In the case of the second recovery method involving alcoholysis, the latter reaction is essentially quantitative and may be carried out with the aid of either dry hydrogen chloride or metallic sodium as the catalyst. Lead monoxide and alkali alcoholates may also be used. Thus, for instance, when t-octyl trifluoroacetate (prepared from 2-ethyl-1- hexene) is reacted with methyl alcohol, methyl trifluoroacetate is generated. The methyl ester is readily removed from the reaction mixture since it boils at the relatively low temperature of 40° C. After completion of the alcoholysis and recovery of all of the low boiling methyl trifluoroacetate as distillate, t-octyl alcohol may be recovered simply by distilling off excess methanol so as to concentrate the higher alcohol in the still. The methyl trifluoroacetate first recovered in the overhead is readily hydrolyzed to methanol and trifluoroacetic acid upon boiling for a short time with an excess of water. The trifluroacetic acid then may be recovered by feeding the aqueous solution to an inverted fractionating column, that it, a stripping column, and removing the higher boiling fraction which consists essentially of the water-trifluoroacetic acid azeotrope (B. P. 105° C.) from the bottom.

The azeotrope may be used as such in the esterification of further amounts of olefin, since olefins will slowly react even with an 80 weight percent aqueous solution of trifluoroacetic acid to give the ester. If desired, a more dilute solution of the acid may be removed from the bottom of the fractionating column and concentrated by extraction with an ether.

In addition to using perfluoroacids for selectively reacting tertiary monoolefins, they can also be used for reacting with non-conjugated diolefins such as hexadiene-1,5 under conditions similar to those required for reacting with tertiary olefins. Such diolefins give a mixture of a diester and an unsaturated mono-ester, the relative proportion of each depending on the proportion of reactants used. Alcoholysis and hydrolysis of these esters can be used for preparing valuable glycols, such as hexane-2,5-diol, or unsaturated alcohols, such as 1-hexene-5-ol.

The invention will now be further illustrated by specific examples. It will be noted that all proportions and percentages are expressed on a weight basis unless otherwise indicated.

EXAMPLE 1

An equimolar mixture of trimethylethylene and pentene-2 possessing a refractive index $n_D^{20}$ of 1.3848 was cooled to a temperature of 3° C. in a glass vessel. Trifluoroacetic acid was likewise cooled to 3° C. and added to the cold olefin mixture in a ratio of 1.2 moles of trifluoroacetic acid per mole of tertiary olefin, that is, trimethylethylene. The temperature of the resulting solution rose to 13° C. upon mixing but with stirring soon dropped to 3° C. After varying periods, aliquot portions of the reaction mixture were titrated with 0.1 N sodium hydroxide to determine the free acid content, and hence to estimate the conversion of trimethylethylene to the corresponding trifluoroacetic acid ester. The results are summarized in Table I.

Table I.—Rate of conversion

| Time After Mixing, Hours | Trimethylethylene Conversion, Percent |
| --- | --- |
| 1 | 85 |
| 2 | 101 |
| 3.5 | 98.5 |

It is apparent that reaction is essentially complete after about 2 hours at temperatures in the vicinity of 0° C.

At the end of the run the reaction mixture was washed with ice water to remove the excess of acid present, dried over anhydrous potassium carbonate, and distilled under reduced pressure as noted in Table II.

Table II.—Product characteristics

| Fraction No. | Weight Percent | B. P. Range, °C. | Refr. Index, $n_D^{20}$ | Saponif. Found | Equivalent Calculated |
| --- | --- | --- | --- | --- | --- |
| 1 | 10.5 | 15 to 25° at 400 mm. Hg | 1.3818 | | |
| 2 | 11.1 | do | 1.3823 | | |
| 3 | 10.4 | do | 1.3818 | | |
| 4 | 13.7 | to 29° at 30 mm. Hg | 1.3471 | 188 | 184 |
| 5 | 52.2 | 29 to 34° at 30 mm. Hg | 1.3472 | | |
| 6 | 2.1 | at and above 34° at 30 mm. Hg | 1.3568 | | |

It is apparent that fractions 1, 2 and 3 consisted essentially of pentenes. Specifically, since the essentially pure olefins used in making up the test mixture had refractive indices of 1.3877 and 1.3810 for the trimethylethylene and pentene-2, respectively, and assuming a straight line relationship between concentration and refractive index, the olefinic portion of the product contained about 15% of trimethylethylene and 85% of pentene, as compared with the original mixture which contained about 50% of each. This demonstrates that the reaction with trifluoroacetic acid may be effectively used in separating tertiary type olefins from other olefins.

The material in fractions 4 and 5 consisted essentially of t-amyl trifluoroacetate. The amount represented a yield of 92 percent of the theoretical. Still better separations may, of course, be obtained either by using a greater ratio of acid to olefin, or by re-treating the unreacted olefin with further acid after separation from the first reaction product, that is, by making two or three successive treatments.

EXAMPLES 2–6

Similar tests were made on other made-up hydrocarbon mixtures by adding to each about 2.5 to 4 moles of trifluoroacetic acid per mole of tertiary olefin and by reacting the mixtures at about 0° C. for two hours. The accuracy and reliability of the invention is apparent from the data summarized in Table III.

Table III.—Analysis of olefinic mixtures

| Example No. | Mixture for Analysis | | "Tertiary" Olefin Content | |
| --- | --- | --- | --- | --- |
| | Components | Composition, percent | Actual | Found |
| 2 | Trimethylethylene | 34.4 | 34.4 | 33.2 |
| | Octene-2 | 33.6 | | [1] 32.9 |
| | n-Paraffins | 32.0 | | |
| | | 100.0 | | |
| 3 | Tetramethylethylene | 20.0 | 20.0 | 19.6 |
| | Cyclohexene | 38.9 | | [1] 19.5 |
| | n-Hexane | 41.1 | | |
| | | 100.0 | | |
| 4 | 1-methyl-1-cyclopentene | 32.2 | 32.2 | 32.4 |
| | n-Hexane | 67.8 | | [1] 32.1 |
| | | 100.0 | | |
| 5 | 4-methyl-1-cyclohexene | 98 | None | 1.6 |
| 6 | Cat. Cracked naphtha, B. P. 90 to 123° C. | Unknown | Unknown | 32.1 / [1] 33.3 |

[1] Duplicate tests.

It is apparent that this separation method is far more accurate and reliable than the various bromine number methods, which frequently give results as much as 20 to 40% off from the true value in the case of teritary olefins. Furthermore, the present method offers a valuable analytical tool in conjunction with the bromine method, since the latter is generally satisfactory for primary and secondary olefins. Thus, the latter may be accurately determined after selective removal of tertiary olefins with the aid of a perfluoro acid.

EXAMPLE 7

Instead of reacting the perfluoroacid with a tertiary olefin at low temperature, a similarly selective separation can be made at elevated temperatures if the acid is modified to give a suitable complex.

For instance, a convenient complex can be prepared by mixing 29.6 parts by weight (0.26 mole) of trifluoroacetic acid and 17.6 parts by weight (0.20 mole) of 1,4-dioxane and subjecting the mixture to distillation. After separation of a small low boiling (100 to 130° C.) fraction, the remainder is recovered in the form of a complex which boils constantly at 130.5 to 132.5° C. (uncorrected). The complex contains 62.3 percent of trifluoroacetic acid as determined by titration with standard base.

A portion totaling 42.9 parts by weight of the above complex and containing the equivalent of 26.7 parts (0.23 mole) of trifluoroacetic acid was charged to a glass pressure flask fitted with a pressure gage and an inlet tube. Isobutylene was introduced into the flask until the pressure reached 20 p. s. i. g. The flask and contents were heated on a water bath at 50° C. for 20 hours. The maximum pressure reached was about 40 p. s. i. g. At the end of the heating period the excess isobutylene was vented. Titration of an aliquot sample indicated that 61 percent of the acid had reacted. On repressuring the flask with isobutylene and heating for 16 additional hours at 50° C., the total conversion of acid reached 69 percent. It is apparent, therefore, that a total of about 7.6 parts of isobutylene reacted with the fluoroacid.

The product from the above reaction was transferred to a glass flask fitted with a reflux condenser, the vent of which was connected to a Dry Ice-acetone trap. The material was gently refluxed at a still temperature of 120° C. for about 3.5 hours. 8.8 parts (116% of theoretical) of isobutylene was thus recovered in the cold trap. The acid content of the material in the flask rose from 17 to 56%, which is equivalent to about 86% of the acid present in the original complex. The presence of at least a catalyst amount of unesterified fluoroacid or other strong acid such as sulfuric acid is desirable in order to carry out this regeneration step. The excess of isobutylene generated probably represents the quantity which had dissolved in, rather than being reacted with, the acid complex.

A similar test wherein isobutylene was contacted with the acid complex at room temperature showed that only about 10% of the acid had undergone reaction.

The foregoing illustrates that isobutylene can be absorbed by the acid-dioxane complex at temperatures between about 40 and 60° C. and regenerated by heating to a higher temperature, such as 100 to 150° C. Besides dioxane, it is possible to use any other complex-forming ether which boils above 30° C., and preferably between about 65° C. and 150° C., e. g. isopropyl ether, sec-butyl ether, n-butyl ether, or the like. This type of reaction my be used with particularly great advantage for removing isobutylene from a mixture of gaseous hydrocarbons such as a refinery C₄ stream and then regenerating the pure isobutylene.

For example a countercurrent absorption tower with the acid entering at the top and the gaseous butylene stream at the bottom is a satisfactory method for attaining the reaction. When the olefinic mixture is a liquid, countercurrent flow is also advantageous using a tower or a series of mixing and settling tanks.

A C₅ refinery stream could be treated similarly for isolating tertiary amylenes. While any isoprene which might be present in such a stream would consume a portion of the reagent acid, this would not be a major drawback since the acid can be recovered.

EXAMPLE 8

In still another test, heptafluorobutyric acid was added to a mixture containing 34.7 percent 1-methyl-1-cyclopentene and 65.3 weight percent n-hexane, in a ratio of 3.8 moles of acid per mole of methylcyclopentene. The test was carried out under substantially the same conditions as in Examples 2–6, and titration of the reaction mixture after two hours indicated that 34.1 percent of the hydrocarbon mixture had reacted with the acid. This again shows the very high selectivity of the perfluoroacid for tertiary olefins.

EXAMPLE 9

The utility of the invention in treating catalytically cracked naphthas is shown below. The principal properties of the naphtha feed are summarized in Table IV.

*Table IV.—Properties of naphtha feed*

| | |
|---|---|
| Boiling range: | |
| °C | 90–123 |
| °F | 194–253 |
| Average mol. weight | 107 |
| Total olefin content, wt. percent | a 58.2 |
| Tertiary content, wt. percent | b 32.7 |
| Total olefins by bromine number, wt. percent | c 65 | a Estimate based on trifluoroacetic acid treatment employed in this example.
b Determined by treatment with trifluoroacetic acid at 0° C. and titration of unused acid.
c Found value known to be higher than actual.

1000 grams (8.8 moles) of trifluoroacetic acid were placed in a 3-liter glass flask fitted with a mechanical stirrer and a dropping bottle. After cooling the acid to 0° C. on an ice-salt bath 1000 grams (about 9.4 moles) of the catalytic naphtha feed, also cooled to 0° C., was slowly added during about one hour while stirring and maintaining the temperature of the mixture below about 1° C. The resulting solution was kept at 0° C. for 30 minutes and then a representative sample of the product solution was titrated for acid content. The analysis indicated that 328 grams of trifluoroacetic acid had reacted. This is equivalent to 308 grams of the naphtha feed, or about 94 percent of the tertiary olefins originally present.

The product solution was washed twice with water (500 and 400 ml.), then with 600 ml. of 0.05 N sodium hydroxide to neutralize any remaining acid, and again with 400 ml. water. The washed product remaining at this point totalled 1328 grams, and consisted of 692 grams of unreacted hydrocarbons and 636 of trifluoroacetates of tertiary olefins. No attempt was made to isolate the esters at this stage since these decompose on distilling as soon as free acid is evolved. However, if desired, it would have been possible to concentrate the esters by distilling under vacuum and at a temperature below about 50° C., as far as any azeotrope formation would permit.

The first water wash mentioned above analyzed about 55% of trifluoroacetic acid. This was recovered by distilling off excess water until the water-acid azeotrope concentrated in the still. Then sufficient sulfuric acid was added to the azeotrope in the still to give a 65% solution of sulfuric acid based on the water present. Finally, anhydrous trifluoroacetic acid was recovered by distillation, amounting to about 90% of the calculated amount.

In preliminary experiments it was found that much higher conversion of tertiary olefins are obtained when the hydrocarbon is added to the perfluoroacid than when the addition is reversed. Likewise it was found that, while reaction temperatures in excess of about 5° C. appreciably reduced the selectivity of the reaction, it was permissible to allow the reacted mixture to warm up to 20 or 30° C.

and remain there for 30 minutes or more, without causing any additional change in the olefin conversion.

1315 grams (99%) of the washed product containing about 630 grams of the esters and 685 grams of unreacted hydrocarbons was then charged to the still of a glass-packed distillation column for alcoholysis. 365 grams of a solution of sodium methylate in methanol prepared by reacting 5 grams of sodium with 360 grams of methanol was added to the still. The mole ratio of methanol to ester thus was about 4:1. Alcohol-ester ratios of at least about 2.5 are desirable if decomposition of the fluoroesters to free acid is to be avoided.

Distillation was begun and the following fractions were collected.

| Frac. | Grams in Frac. | B. P. Range, °C. | Contents |
|---|---|---|---|
| 1 | 384.1 | 39° to 50° (mainly 39°). | 340 grams of methyl trifluoroacetate; 44.1 grams of methyl alcohol. |
| 2 | 445.2 | 50° to 90° (mainly 56° to 63°). | 1.3 grams of methyl trifluoroacetate; 207 grams of hydrocarbons; 238.2 grams of methyl alcohol. |
| 3 | 439.5 | 90° to 123° | unconverted hydrocarbons. |
| Residue | 386.5 | | essentially all t-alcohols. |

The amount of methyl trifluoroacetate in fractions 1 and 2 above was determined by titration with 0.5 N sodium hydroxide; such a titration is possible because of the ease with which the ester hydrolyzes in water. The total amount (341.3 grams) of the ester obtained as distillate represents a yield of 93.5 percent of the theoretical. It is probable that the actual yield was essentially quantitative and that the difference (23.7 grams) was lost on handling the low-boiling ester.

The material in fraction 2 consisted mainly of hydrocarbons and methyl alcohol which distilled off as an azeotrope until all of the excess methyl alcohol had been collected in the distillate. The material in this fraction was washed with water to remove the methyl alcohol present, leaving 207.0 grams of a hydrocarbon. The latter material was combined with the hydrocarbon portion collected as fraction 3; thus, the total weight of unconverted hydrocarbons amounted to 646.5 grams.

The combined hydrocarbon portion possessed a bromine number of 53.5 which is equivalent to a concentration of 35.8 percent of secondary type olefins. Thus, 234 grams (646.5 x 100/99 x .358) of olefins remained in the original feed.

An analysis made on the above combined unconverted hydrocarbon portion indicated that 6.9 percent consisted of tertiary olefins, corresponding to 4.5 percent based on the original feed. However, on the basis of an analysis for tertiary olefins in the original feed and the amount of tertiary olefins removed by means of the trifluoroacetic acid treatment only 2 percent of the feed or 20 grams of tertiary type olefins were indicated to be unconverted. The latter figure is believed to be more reliable since non-tertiary type olefins always tend to distort the results by about 2 or 3%.

The alcoholic residue from the above distillation was distilled under reduced pressure as noted below:

| Frac. | Grams in Frac. | B. P. Range, °C. | R.I., $n_D^{20}$ | $d_4^{20}$ |
|---|---|---|---|---|
| 1 | 333 | 87° to 114°/100 mm. Hg (about 135° to 155° at atmos. pressure). | 1.4338 | about 0.54. |
| Residue | 53.5 | | | |

The distillate composing fraction 1 above consisted essentially of tertiary alcohols while the residue, which was thick and viscous possibly due to the presence of some sodium alcoholates, contained not only some alcohols but also a small proportion of hydrocarbon polymers. The residue was subjected to a steam distillation whereupon an additional 14 grams of tertiary alcohols ($n_D^{20}$ 1.4361) was obtained with the first 30 ml. of water distillate. A residue was left which consisted mainly of hydrocarbon polymers and totaled 39.5 grams. Upon further steam distillation 5.3 grams of unsaturated hydrocarbon polymers ($n_D^{20}$ 1.4520 to 1.4821) were collected in the next 130 grams of water distillate.

The various products isolated from the preceding esterification and alcoholysis steps are summarized in Table V.

Table V.—Product summary

TRIFLUOROACETIC ACID ADDITION

| | |
|---|---|
| Catalytic naphtha charge, B. P. 90° to 123° C., grams | 1000 |
| Naphtha reacting, grams | 308 |
| Naphtha unreacted (by difference), grams | 692 |
| Total olefins in naphtha, grams | 582 |
| Esters + unreacted naptha produced, grams | 1328 |

ALCOHOLYSIS

| | Actual | Basis: 1,000 gms. feed |
|---|---|---|
| Esters + unreacted naphtha charged, grams | 1,315 | 1,328 |
| Unreacted naphtha, B. P. 90° to 123° C. recovered | 646.5 | 653 |
| Unreacted olefins remaining in 90° to 123° C. portion | 232 | 234 |
| t-Alcohols produced | 347 | 351 |
| Olefin Polymers | 39.5 | 40 |

It is to be noted that the combined weight of unreacted naphtha recovered and the olefin polymers total 693 grams which is almost exactly equal to the 692 grams of unreacted naphtha estimated by difference. This indicates that about 4 percent of the naphtha feed (or about 6.7 percent of the total olefins in the feed) polymerized during the treatment.

The total olefin content of the naphtha essentially equals the sum of olefins reacting with the trifluoroacetic acid (308 grams) plus the unreacted olefins in the recovered hydrocarbon fraction (234 grams) plus the olefin polymers (40 grams); which amounts to 582 grams or 58.2 percent of the naphtha feed.

It also is to be noted that the trifluoroacetic acid treatment removed 308 grams of tertiary olefins from the naphtha feed. This amount represents 53 percent of the total olefin content. Further, since the naphtha feed contained 32.7 percent of tertiary olefins it is apparent that about 94.5 percent of these olefins were removed by the treatment.

In order to note the nature of the t-alcohols isolated as above, 15 grams of the alcohol fraction was dehydrated by heating in the presence of a trace of iodine. The resulting olefin portion was distilled through an efficient distillation column with the results tabulated below:

| Frac. No. | Ml. in Frac. | Total ml. Distilled | Reflux Temp. °C. (uncorr.) | R.I., $n_D^{20}$ | Br. No. |
|---|---|---|---|---|---|
| 1 | 1.5 | 1.5 | 90 | 1.4150 | 181 |
| 2 | 1.5 | 3 | 90 | 1.4152 | |
| 3 | 3 | 6 | 90 | 1.4155 | |
| 4 | 1 | 7 | 95 | 1.4167 | |
| 5 | 1 | 8 | 97 | 1.4189 | |
| 6 | 1 | 9 | 99 | 1.4241 | |
| 7 | 1 | 10 | 99 | 1.4275 | 180 |
| 8 | 1 | 11 | 99 | 1.4302 | |
| 9 | 1 | 12 | 99 | 1.4289 | |
| Residue | 2 | 14 | [1] 116–120 | 1.4200 | |

[1] Determined by a separate distillation.

A mixture of some or all of the olefins listed in Table VI, below, appears to have resulted.

The washed hydrocarbon portion remaining after the alcoholysis was further treated with trifluoroacetic acid to remove the less reactive secondary type olefins. A 50 gram portion of this hydrocarbon material was mixed with 20 grams of trifluoroacetic acid and the resulting mixture was charged to a glass pressure flask and heated at a temperature of 140° C. for a period of 6 hours. The maximum pressure noted during the period of heating was Table VI.—*Type III olefins and corresponding alcohols*

| Olefin | B. P., °C. | $n_D^{20}$ | Alcohol Equivalent | B. P., °C. | $-n_D^{20}$ |
|---|---|---|---|---|---|
| 3-methyl-2-ethyl-1-butene | 89 | 1.4120 | 1-methyl-1-isopropyl-propan-1-ol | 139 | 1.4246 |
| 3,4-dimethl-2-butene: | | | 2,3-dimethyl-butan-3-ol | 136.5 | 1.4239 |
| cis | 90 | 1.4130 | | | |
| trans | 89 | 1.4104 | | | |
| 2-methyl-1-hexene | 91 | 1.4040 | 2-methyl-hexan-2-ol | 143 | 1.4179 |
| 3-methyl-2-hexene | 93 | 1.4080 | 3-methyl-hexan-3-ol | 143 | 1.4231 |
| 1,3-dimethylcyclopentene | 93 | 1.4283 | | | |
| 2-methyl-2-hexene | 94 | 1.4075 | 2-methyl-hexan-2-ol | 143 | 1.4179 |
| 3-methyl-3-hexene | 94 | 1.4050 | 3-methyl-hexan-3-ol | 143 | 1.4231 |
| 2-ethyl-1-pentene | 94 | 1.4050 | 3-methyl-hexan-3-ol | 143 | 1.4231 |
| 2-methyl-2-hexene | 95 | 1.4105 | 2-methyl-hexan-2-ol | 143 | 1.4179 |
| 3-ethyl-2-pentene | 95 | 1.4120 | 3-ethyl-pentan-2-ol | 143 | 1.4300 |
| 2,3-dimethyl-2-pentene | 97 | 1.4211 | 2,3-dimethylpentan-2-ol or 2,3-dimethylpentan-3-ol | 139 136.5 | 1.4234 1.4239 |
| 1,2-dimethyl-1-cyclopentene | 105 | 1.4444 | | | |
| 1-ethyl-1-cyclopentene | 107.5 | 1.4430 | | | |

70 p. s. i. g. Titration of a sample of the product at this point indicated that 12.5 grams of unreacted trifluoroacetic acid was present. This means that 8.2 grams (0.072 mole) of trifluoroacetic acid reacted and 7.7 grams of olefin was converted to the ester. The reaction product was washed with water and then with a little dilute sodium hydroxide solution to remove the excess acid. A yield of 60 grams of a mixture of fluoroesters and unreacted hydrocarbons was recovered.

The still of a small glass-packed distilling column was charged with 60 grams of the above product and a solution of sodium methylate prepared by reacting 0.2 gram of sodium with 10 grams of methyl alcohol was added. The mixture was heated until refluxing began and the following fractions of distillate were obtained:

| Frac No. | Grams in Frac. | B. P. Range, ° C. | Remarks |
|---|---|---|---|
| 1 | 4.0 | 39° to 50° (Mainly 39°) | Contains essentially only methyl trifluoroacetate. |
| 2 | 16.6 | 50° to 80° (Mainly 56° to 63°). | Methanol fraction when water washed yielded 7.0 grams of hydrocarbons. |
| 3 | 26.2 | 80° to 123° (Mainly 90° to 123°). | Unreacted hydrocarbons. |
| Residue | 15 | | Higher alcohol portion. |

The hydrocarbon material in fractions 2 and 3 when combined totaled 33.2 grams and was found to have a bromine number of 18.8. This indicated that only 12.5 percent by weight of olefins remained in the hydrocarbon portion, as compared to 35.8% olefins present in the hydrocarbon portion which was subjected to the hot fluoroacid treatment.

The alcohol-containing residue from the above distillation was distilled from a small side-arm distilling flask and found to boil as follows:

[Charge to flask: 16 grams.]

| Frac. No. | Grams in Frac. | B. P. Range, ° C. | Probable Contents |
|---|---|---|---|
| A | 10 | 160° to 183° | sec.-alcohols. |
| B | 3 | 240° to 325° | olefin polymers. |
| Residue | 2 | above 325° | Do. |

As indicated above, the material in fraction A consisted mainly of secondary alcohols while the remainder was chiefly olefin polymers. A great portion of the latter probably resulted from the polymerization in the presence of the trifluoroacetic acid of tertiary olefins left unreacted by the previous cold acid treatment at 0° C.

A summary of the products isolated by means of the hydrolysis reactions is given in Table VII.

Table VII.—*Product summary*

[Basis: Catalytic naphtha feed.]

| | Percent Based on Feed | Percent Based on Total Olefins (582 grs.) in Feed |
|---|---|---|
| Converted to tertiary alcohols (A) | 30.8 | 53.0 } 70.4 |
| Converted to Other Alcohols (B) | 10.1 | 17.4 |
| Converted to Polymers (A) | 4.0 | 6.9 |
| Converted to Polymers (B) | 6.5 | 11.1 |
| Unconverted Olefins | 6.1 | 10.4 |
| Other Unconverted Hydrocarbons | 42.5 | |

| | | Percent of Total Alcohol Formed |
|---|---|---|
| Alcohols: | | |
| Tertiary Type Alcohols | 35.1 | 72.9 |
| Other Alcohols | 13.1 | 27.1 |
| Total | 48.2 | 100.0 |

(A) By cold fluoroacid treat and alcoholysis.
(B) By hot fluoroacid treat and alcoholysis.

The value of the overall process from a fuel standpoint is illustrated in Table VIII which summarizes characteristic octane number determinations made on certain portions and products of the naphtha feed, as well as on a standard gasoline base stock blended with the isolated portions or products.

Table VIII.—*Octane number determinations*

| Sample | Source | Research Clear Octane No. | | |
|---|---|---|---|---|
| | | Overall | Blending O. N. in Base Naphtha of 81 Research Clear O. N. | |
| | | | 15% | 30% |
| Original Feed | Cat. Naphtha, B. P. 90 to 123° C. | 74.5 | 77 | 77.5 |
| Tertiary Olefins | Obtained from feed by dehydration of t-alcohols produced in process. | 87.5 | 86 | 87 |
| Tert-Alcohols | t-alcohols obtained in process. | | 83 | 86.5 |
| Raffinate [1] | naphtha remaining after removal of tertiary olefins. | [1] 81 | 81 | 80.5 |

[1] This portion contained about 5 percent by volume of t-alcohols which probably accounts for the unexpectedly high octane number.

It is apparent that the present invention offers a valuable means for upgrading the anti-knock characteristics of naphtha fractions. In addition, as indicated previously, it permits quantity production of various alcohols which heretofore have been largely in the class of laboratory curiosities.

The advantages of selectively removing the tertiary olefins at a low temperature before removal of the less reactive olefins is illustrated by the following run wherein another sample of the previously described catalytic naphtha was directly treated with perfluoroacetic acid at 140° C. Specifically, 50 parts of the naphtha feed were mixed at room temperature with 32 parts of trifluoroacetic acid and heated in a glass pressure flask at 140° C. for 4 hours. The maximum pressure reached 42 p. s. i. g. Titration of a sample of the resulting product indicated that only 9.9 parts of the acid had reacted. This is equivalent to a conversion of only 9.3 parts of naphtha olefins to alcohols. Thus, only 34.5% of the total olefins present were converted in this one step treatment, as opposed to a conversion of 53.0% in the low-temperature step, and 70.4% total olefin conversion, in the stepwise process previously described.

The product of the one-step hot fluoroacid treatment was subjected to alcoholysis by mixing it with and distilling it in the presence of an alcoholic solution of sodium methylate prepared by reacting 0.1 part of sodium with 6 parts of methanol. The following distillate fractions were obtained:

| Frac. | Parts | B. P. Range, °C. | Composition |
| --- | --- | --- | --- |
| 1 | 9.0 | 39 | Methyl trifluoroacetate. |
| 2 | 9.0 | 50–90 | Water wash yielded 5 parts of hydrocarbon; balance essentially methanol. |
| 3 | 20.0 | 90–123 | Hydrocarbons. |
| Residue | 23.5 | Above 123 | Alcohols and olefin polymers. |

The 25 parts of hydrocarbons in fractions 2 and 3 contained 9.6% of olefins as indicated by a bromine number of 14.3. Since the original naphtha contained 54% olefins, it is apparent that 91% of these olefins were converted to alcohols and higher boiling polymers. However, on the basis of the amount of methylfluoroacetate produced, it is also apparent that the residue contained about 14.5 parts polymer and only about 9 parts of alcohols. Thus, only about 30% of the total olefins were converted to alcohols and about 60% to polymers. This contrasts with a conversion of about 70% of olefins to alcohols and only 18% to polymers in the preferred two-step process. Of course, the high temperature process may be of interest where it is actually desired to remove the tertiary olefins as polymers.

The present invention also offers numerous advantages if the selective cold perfluoroacid esterification and acid recovery are followed by steps other than the hot perfluoroacid treat described in Example 9. For instance, it may be advantageous to remove tertiary olefins from a hydrocarbon mixture by the cold perfluoroacid treatment, whereupon the remaining hydrocarbons may be treated with sulfuric acid for the purpose of hydration, isomerization, polymerization or alkylation.

This application is a continuation-in-part of our copending application Serial No. 387,522, filed October 21, 1953.

The foregoing general description and the various specific examples will serve to illustrate the nature and utility of the present invention. However, it will be understood that the extent of solicited patent protection is not necessarily limited thereto except as determined by simultaneous reference to the scope and spirit of the appended claims.

We claim:

1. A process for removing olefins of the class consisting of aliphatic and cycloaliphatic mono-olefins and non-conjugated diolefins from a mixture of hydrocarbons which comprises mixing the hydrocarbon mixture with an excess of a perfluoro organic acid to convert the olefins into esters of the perfluoroacid, and separating unreacted hydrocarbons from the reaction mixture.

2. A process according to claim 1 wherein the prefluoroacid is perfluorosuccinic acid.

3. A process for selective reaction of tertiary $C_4$ to $C_{16}$ olefins selected from the class consisting of aliphatic and cycloaliphatic mono-olefins in a hydrocarbon mixture containing other types of olefins which comprises contacting the hydrocarbon mixture at a suitable temperature below about 70° C. with a perfluoro organic acid in a ratio of about 1.2 to 10 moles of acid per mole of said tertiary olefin to convert the olefins into fluoroacid esters, and separating unreacted hydrocarbons from the other reaction products.

4. A process according to claim 2 wherein the perfluoro acid is perfluorosuccinic acid.

5. A process according to claim 3 wherein the perfluoro acid is heptafluorobutyric acid.

6. A process according to claim 3 wherein the perfluoro acid is pentafluoropropionic acid.

7. A process according to claim 3 wherein the perfluoro acid is trifluoroacetic acid.

8. A process for selective reaction of tertiary aliphatic monoolefins from a hydrocarbon mixture boiling in the naphtha range and containing other types of olefins which comprises contacting the hydrocarbon mixture at a temperature between about −5 and +5° C. with trifluoroacetic acid in a ratio of about 1.2 to 10 moles of acid per mole of tertiary olefin.

9. An analytical method employing the process of claim 8 wherein the mole ratio of acid to tertiary olefin is in excess of 5 and wherein the unreacted acid is titrated with a standard base at the end of the contacting period, thereby determining the amount of tertiary olefin originally present.

10. A process according to claim 8 wherein the mole ratio of acid to tertiary olefin is less than 2.5 and wherein the reaction mixture at the end of the contacting period is reacted with a methanol solution of sodium methylate, and the resulting mixture is distilled to produce a methyl trifluoroacetate fraction, a hydrocarbon fraction, and a fraction of alcohols corresponding to the reacted tertiary olefins.

11. A process for treating cracked naphtha which comprises contacting said naphtha at a temperature between about −15 and +15° C. with a perfluoroacid reagent having the formula $C_nF_{2n+1}COOH$ wherein $n$ is an integer ranging from 1 to 3 in a ratio of about 1.2 to 10 moles of said reagent per mol of tertiary aliphatic and cyclo-aliphatic mono-olefin present in said naphtha, separating the unconverted naphtha portion from the resulting esters, olefin polymer, and unreacted acid, mixing the separated naphtha portion with the aforesaid reagent added in excess with respect to the olefin remaining in the separated naphtha portion, heating the mixture to a temperature of about 100 to 200° C. until a major proportion of the olefins present in said naphtha portion is reacted with the acid, and separating the remaining hydrocarbons from the resulting esters, olefin polymers and unreacted acid.

12. A process according to claim 11 wherein the esters from the low temperature step are converted into tertiary alcohols by alcoholysis with a $C_1$ to $C_3$ alcohol.

13. A process for separating olefins of the class consisting of tertiary aliphatic and cycloaliphatic mono-olefins from a mixture containing other hydrocarbons which comprises contacting said mixture at a temperature of about 40 to 60° C. with a complex of an acid having the formula $C_nF_{2n+1}COOH$ wherein $n$ is an integer ranging from 1 to 3 and a complex forming ether, and separating the unreacted hydrocarbon from the fluoroacid ester complex.

14. A process according to claim 13 wherein the hydrocarbon mixture is a $C_4$ cut containing isobutylene.

15. A process according to claim 14 wherein the ether is dioxane-1,4.

16. A process according to claim 14 wherein the separated fluoroacid ester complex is heated to a temperature of about 100 to 150° C. to separate isobutylene therefrom.

17. In a cyclic process for the selective separation of $C_6$ to $C_{16}$ olefins of the class consisting of tertiary aliphatic and cycloaliphatic mono-olefins, the improvement which comprises contacting a hydrocarbon mixture which contains the aforementioned olefins as well as other types of olefins at a temperature between about $-15$ and $+15°$ C. with a mono-basic aliphatic perfluoroacid in a ratio of about 1.2 to 10 mole equivalents of acid per mole of said tertiary mono-olefin, converting the resulting perfluoroacid ester into free perfluoroacid and a member of the class consisting of regenerated tertiary-olefin and derivatives thereof, and recycling the free acid to the contacting step.

18. A process according to claim 17 wherein the perfluoroacid is trifluoroacetic acid.

19. A process according to claim 17 wherein the perfluoroacid is pentafluoropropionic acid.

20. A process according to claim 17 wherein the perfluoroacid is heptafluorobutyric acid.

References Cited in the file of this patent

UNITED STATES PATENTS

| | | |
|---|---|---|
| 868,252 | Bouveault et al. | Oct. 15, 1907 |
| 1,491,076 | Burghart | Apr. 22, 1924 |
| 1,939,384 | Buc | Dec. 12, 1933 |
| 2,007,160 | Engs et al. | July 9, 1935 |
| 2,012,785 | Deanesly et al. | Aug. 27, 1935 |
| 2,019,022 | Scott et al. | Oct. 29, 1935 |
| 2,446,114 | Strassburg | July 27, 1948 |
| 2,515,006 | Hudson | July 11, 1950 |
| 2,567,011 | Diesslin et al. | Sept. 4, 1951 |

OTHER REFERENCES

Allen: "Commercial Organic Analysis," vol. II, part II, page 246, third ed., published by P. Blakiston's Son & Co., Philadelphia, Pa. (1900).